(12) United States Patent
Sakakura

(10) Patent No.: US 6,334,139 B1
(45) Date of Patent: *Dec. 25, 2001

(54) AGENT SYSTEM

(75) Inventor: Takashi Sakakura, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,555

(22) Filed: Dec. 16, 1997

(30) Foreign Application Priority Data

Jun. 12, 1997 (JP) ................................ 9-154811

(51) Int. Cl.$^7$ ............................... G06F 15/16; G06F 13/00
(52) U.S. Cl. .......................... 709/202; 709/203; 709/317
(58) Field of Search .................................. 709/202, 203, 709/200, 223, 224, 201, 317; 714/47, 48

(56) References Cited

U.S. PATENT DOCUMENTS

| | | | |
|---|---|---|---|
| 5,499,364 | * 3/1996 | Klein et al. | 709/202 |
| 5,581,691 | * 12/1996 | Hsu et al. | 714/15 |
| 5,603,031 | 2/1997 | White et al. | |
| 5,655,081 | * 8/1997 | Bonnell et al. | 709/202 |
| 5,758,083 | * 5/1998 | Singh et al. | 709/202 |
| 5,812,810 | * 9/1998 | Sager | 712/216 |
| 5,822,585 | * 10/1998 | Noble et al. | 709/202 |
| 5,835,724 | * 11/1998 | Smith | 709/202 |
| 5,850,517 | * 12/1998 | Verkler et al. | 709/202 |
| 5,887,171 | * 3/1999 | Tada et al. | |
| 5,963,944 | * 10/1999 | Adams | 709/202 |

FOREIGN PATENT DOCUMENTS

| | | |
|---|---|---|
| 07 66172A1 | 4/1997 | (EP) |
| 08 03811A2 | 10/1997 | (EP) |
| 97 10547A1 | 3/1997 | (WO) |

OTHER PUBLICATIONS

Riva et al., "LispWeb: a Specialized HTTP Server for Distributed AI Applications", Fifth International World Wide Web Conference, pp. 1–11, May 1996.*
Anonymous, "Smart Components", Data Based Advisor, v 12 n10, p. 35, Oct. 1994.*
Mardesich, Jodi, "Management platforms are no network cure–all", InfoWorld v16 n46, p. 79, Nov. 1994.*
Snell, Monica, "New road map guides developer; FTP Software changes direction on superhighway", LAN Times, v12 n15, pp. 45, Aug. 1995.*
Anonymous, "Smart move in a networked world", Computer Reseller News, n 731, p. 117, Apr. 1997.*
Slocum et al., "Is Java a successor to SNMP distributed management?", Telecommunications, v32 n2, p. 70, Feb. 1998.*
Grimes, Seth, "Agents come in from the cold", Database Programming and Design, v11 n4, p. 48, Apr. 1998.*
Carnes et al., "Task planning for autonomous control systems", Intelligent Control, pp. 347–352, Aug. 1991.*

* cited by examiner

*Primary Examiner*—Robert B. Harrell
*Assistant Examiner*—Almari Romero

(57) ABSTRACT

The agent system sends both program and data together to a destination to perform execution, and the system is provided with agent re-execution and cancelling procedures, making mission critical application possible. The non-volatile memory area is prepared in the processing system where the agent is being processed to store the executed operation log.

19 Claims, 13 Drawing Sheets

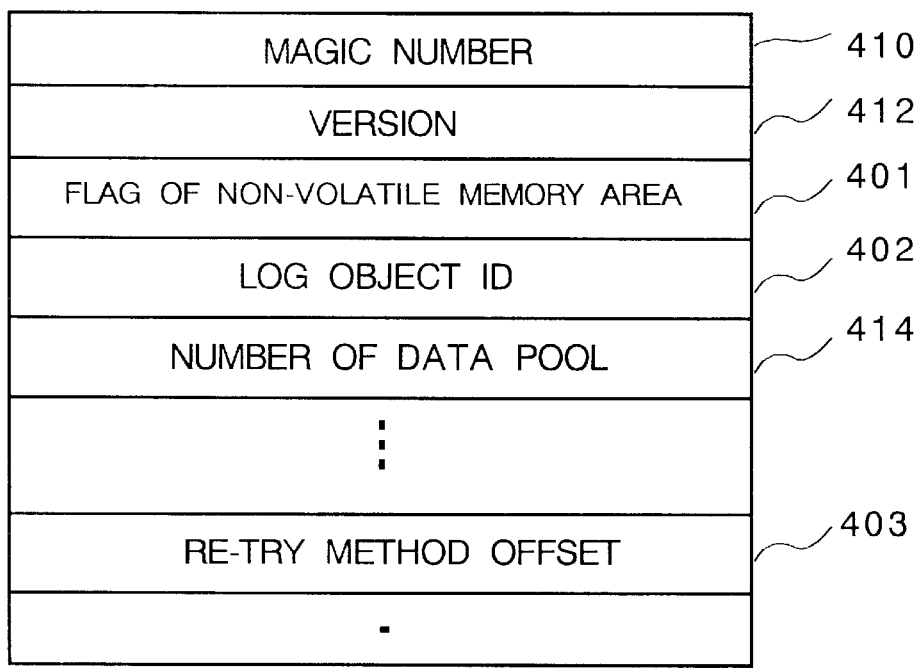
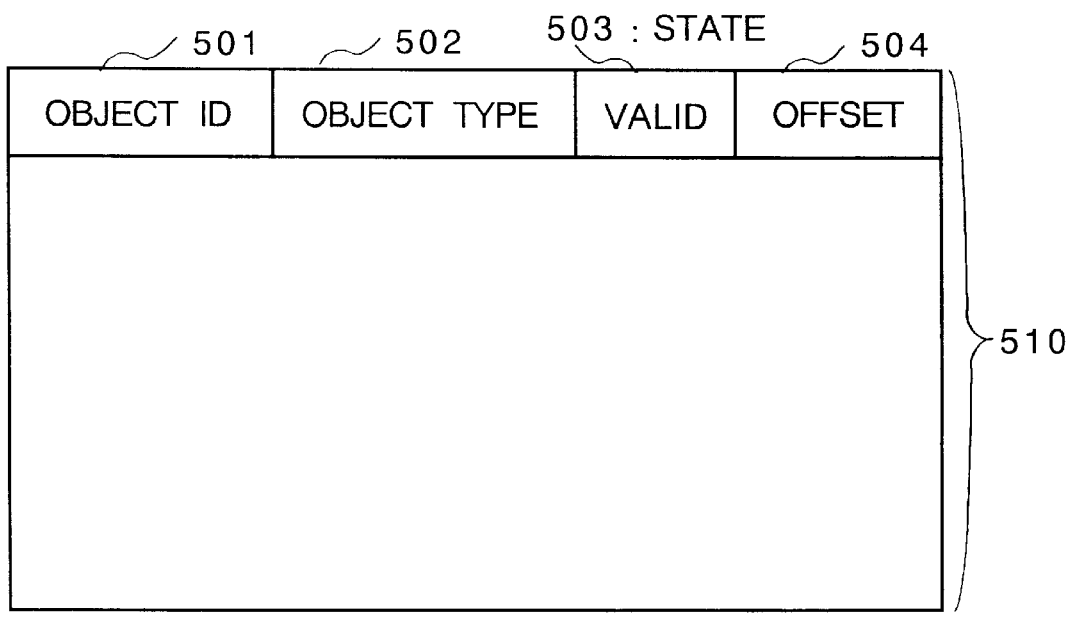

Fig.11

| | | |
|---|---|---|
| 601 | got into "kailua@abc.opqrs.co.jp" | 97:1:30:18:55:10 |
| 602 | Tr1 started | 97:1:30:18:55:11 |
| 603 | Tr1 commit started | 97:1:30:18:55:21 |
| 604 | Tr1 commited | 97:1:30:18:55:33 |
| 605 | Tr2 started | 97:1:30:18:55:33 |
| 606 | Tr2 commit started | 97:1:30:18:55:44 |
| 607 | Tr2 commited | 97:1:30:18:55:51 |
| 608 | got out from "kailua@abc.opqrs.co.jp" | 97:1:30:18:55:51 |

Fig.12

| | | |
|---|---|---|
| 701 | got into "kailua@abc.opqrs.co.jp" | 97:1:30:18:55:10 |
| 702 | Tr1 started | 97:1:30:18:55:11 |
| 703 | Tr1 commit started | 97:1:30:18:55:21 |

Fig.15

| SERVERS | PROPERTY INFORMATION 1116 | | | |
|---|---|---|---|---|
| | NON-VOLATILE MEMORY AREA | DB ACCESS | PROCESSING ABILITY | |
| A | AVAILABLE | NOT AVAILABLE | HIGH | ---- |
| B | AVAILABLE | AVAILABLE | LOW | ---- |
| C | AVAILABLE | AVAILABLE | HIGH | ---- |
| D | NOT AVAILABLE | AVAILABLE | HIGH | ---- |

AGENT SYSTEM

BACKGROUND OF THE INVENTION

1. Field of the Invention

The present application is related to an agent system that executes an object having information on processing procedures and data under various communication environments where a variety of computers are interconnected. The object is sent to a particular computer as an "agent" and is executed at the destination computer.

2. Description of the Related Art

Recently, software technology using agent systems have become commonly known. The agent systems adopt a form of processing that executes the objects including data and programs (also termed processing order or procedure) and sends the object (also termed agent or network agent) to a particular computer. The agent described in the specification is not related to a broadly-defined software agent stationed inside a computer to perform a particular task. The agent in this specification is a network agent. The network agent is an agent that moves within the network, and, for example, searches information requested by a user or executes a pre-determined process. The invented agent is related to an object having identification information, processing procedures and data. The agent is matched with a particular communication environment to execute the agent at a computer or server system.

The agent of this type is disclosed in Japanese unexamined patent application no. hei7-182174 (corresponds to U.S. patent application Ser. No. 08/090521, application date Jul. 8, 1993) and is entitled "Reinforcement of remote programming" discloses a specification of the descriptive language of an agent called Telescript developed by General Magic Inc., as shown in FIGS. 16~18. FIG. 16 is a diagram on the configuration of computer system for the related art. FIG. 17 is a flow chart of operation using remote programming for the related art. FIG. 18 is a diagram showing a remote programming network for the related art.

According to Japanese unexamined patent application no. hei7-182174, mass memory 917A such as magnetic disk and magnetic tape are used to store a part of data or used to store a program that cannot be accommodated at main memory 917B due to a size limitation. Mass memory 917A is also used when the mass memory 917A is not required immediately by the program, data or CPU910. See pg. 12, column 21, lines 27~32.

Further, Japanese unexamined patent application no. hei7-182174 discloses a system demonstrated by Wolfson et al., in which a particular process moves from one computer system to an another computer system within a network. The process memorizes a data directly to a mass memory of computer system where the process is being executed, or searches for a data directly from the mass memory. See pg. 15, column 27, lines 7~9 and 20~23.

The flow chart in FIG. 17 illustrates a specific example of remote programming. In order to implement the specific example under the remote programming environment, a client process 9352 (FIG. 18) creates a program made from instructions as indicated on the detailed flow chart in step 931 (FIG. 17). The detail of step 931 is explained below.

The process advances from create remote program step 931 to send remote program step 932. The remote program is sent to a computer 930B (FIG. 18) via a network 9356, as shown by the arrow 9358. The process advances to program execution remote step 933, and the program is executed by the computer 930B. This program execution is a process 9352A (FIG. 18) performed by computer 930B. As for the process 9352A, the instructions for program execution follows the flow chart displayed in step 931, accordingly.

In step 931-B (FIG. 17) a list of file names is created. Each filename in the list (of file names) is searched in a directory of computer 930B. If a file name matches with any file names in the list, 931-D, the file has not been updated within the last 30 days, 931-F, then the file is deleted in step 931-G. By sending an appropriate instructions to a server process 9354 (FIG. 18). The process returns to step 931-C from step 931-G (FIG. 17) via step 931-J to evaluate the next file name. When all of the files on the list are evaluated, the process 9352A terminates as shown at step 931-C and 931-K. As the arrow 9360 (FIG. 18) indicates, all the interactions between the process 9352A and the server process 9354 occur inside the computer 930B without having to interact with the network 9356.

After the program has been successfully completed, the process moves from the program execution in remote step 933 to receive report of program execution step 934 (FIG. 17). The server process 9354 (FIG. 18) reports the successful completion of the program to the client process 9352 as shown by the arrow 9362. The remote programming procedure uses the network transmission media only twice. The first use is shown by the arrow 9358 in which the list of instructions i.e. the program is transmitted to the server process 9354. The second use is shown by the arrow 9362 in which the client process 9352 receives a notification of successful completion from the server process 9354. See hei7-182174, pg. 14, columns 25 and 26.

The conventional technology discussed above discloses that the process stores a data directly in a mass memory of the computer system where the process is being executed, or searches for the data directly from the mass memory. Storing data in the mass memory refers to the storage of data for processing. There is no disclosure of the storage of the process itself or the storage of control information related to process execution.

As for the remote programming procedure, the server process 9354 reports the successful completion of program execution to the client process 9352. This reporting is understood as reporting a status of normality or abnormality in program completion, since there is no disclosure of tracing a status of program execution for interval reporting to a client. Also, there is no disclosure of storing the traced execution status. Furthermore, although the conventional technology discloses remote program transmission and remote program execution, the conventional technology does not reach storing the remote program to a backup storage (the mass memory) of a server. Because the conventional agent system does not store the object (agent) in a disk, the processing system is unable to re-execute the agent when the agent execution does not complete normally.

In the above mentioned system, the conventional agent cannot be used successfully in mission critical tasks because the system suffers from the following problems. First, because a log data which is determined by the agent execution is not stored on disk, the agent system is unable to enquire for an execution result from the log data. Second, the agent system is unable to find a processing path taken for an agent transmission. Third, the agent system is unable to ask for agent re-execution when the agent system is interrupted during agent execution. Fourth, the agent system does not have a re-try method to find the log data during an execution interruption to attempt to recover a database.

Finally, according to the conventional agent technology, an operation at the user terminal and the agent execution at the distant computer are not processed synchronously. For this reason, if a system malfunction occurs during the execution of a program, the user is unable to know about the damage outbreak or its content. For instance, if the agent becomes lost when collecting retrieval data from a server connected to internet, the damage is not very serious for the user. However, if an error occurs in the agent program that performs the transaction processing of a database, the damage will be huge for the user. Because of this disadvantage, the conventional agent technology cannot been used for programs or services involving important or mission critical transactions.

SUMMARY OF THE INVENTION

These and other objects are accomplished by the present invention as hereinafter described in further detail. The invention attempts to solve the problem mentioned above, and aims to achieve the agent system for performing a mission critical processing which requires a high credibility of the agent. Being different from conventional general-purpose machines such as a centralized system or a client/server-type system, the invented agent takes a form of processing by transmitting an object having a program and data to a particular computer for execution.

A further advantage is obtained by providing an agent system that uses an operation log as an indicator for the status of agent execution. Thus, the agent system of the present invention allows for re-execution of an interrupted agent and allows for cancellation of an issued agent.

According to one aspect of the present invention, the agent system includes a user terminal where an agent having a data and a procedure to process the data is created and transmitted, and a server having a processing system that receives the agent transmitted from the user terminal and processes the data according to the procedure written in the received agent, and also having a non-volatile memory area that can be used by the received agent.

The processing system collects an operation log which is an indicator of the status for agent execution stores at least one of the received agent or the operation log to the non-volatile memory area, and sends back the operation log to the user terminal.

The processing system performs an agent re-execution when both the received agent and the operation log are stored in the non-volatile memory area by referring to the operation log stored in the non-volatile memory area.

The processing system performs an agent re-execution when the operation log is stored in the non-volatile memory area, by referring to the operation log stored in the non-volatile memory area, re-issuing of agent at the user terminal is requested.

The user terminal performs an agent re-execution by referring to the returned operation log to re-issue an agent corresponding to the operation log. The user terminal then deletes the agent by referring to the operation log.

The user terminal also issues a chasing agent to chase a previously issued agent by referring to the operation log, and simultaneously cancels a recorded operation log corresponding to the previously issued agent.

According to another aspect of the invention, the agent system includes a user terminal for sending an agent to a plurality of processing systems on servers as destinations connected via network, and a property information server storing an information related to properties of a plurality of processing systems as the property information. The agent system executes the agent by selecting a processing system for execution by referring to the property information stored at the property information server.

According to still another aspect of the invention, the agent system includes a user terminal which creates and transmits an agent having data and a procedure to process the data, and a server provided with a processing system that receives the agent which is sent by the user terminal, executes the agent, processes the data according to the procedure, and returns the operation log that has executed the agent to the user terminal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention, and wherein:

FIG. 9 is a schematic view showing an example of the control information of an agent object in accordance with the invention;

FIG. 10 is a schematic view showing an example of control information stored in the non-volatile memory in accordance with the invention;

FIG. 11 illustrates an example of the operation log in accordance with the invention;

FIG. 12 illustrates an another example of the operation log in accordance with the invention;

In FIG. 15 is a schematic view showing one example of property information for the property information server of the invention;

DETAILED DESCRIPTION OF THE PREFERRED EMBODIMENTS

Figure 1:
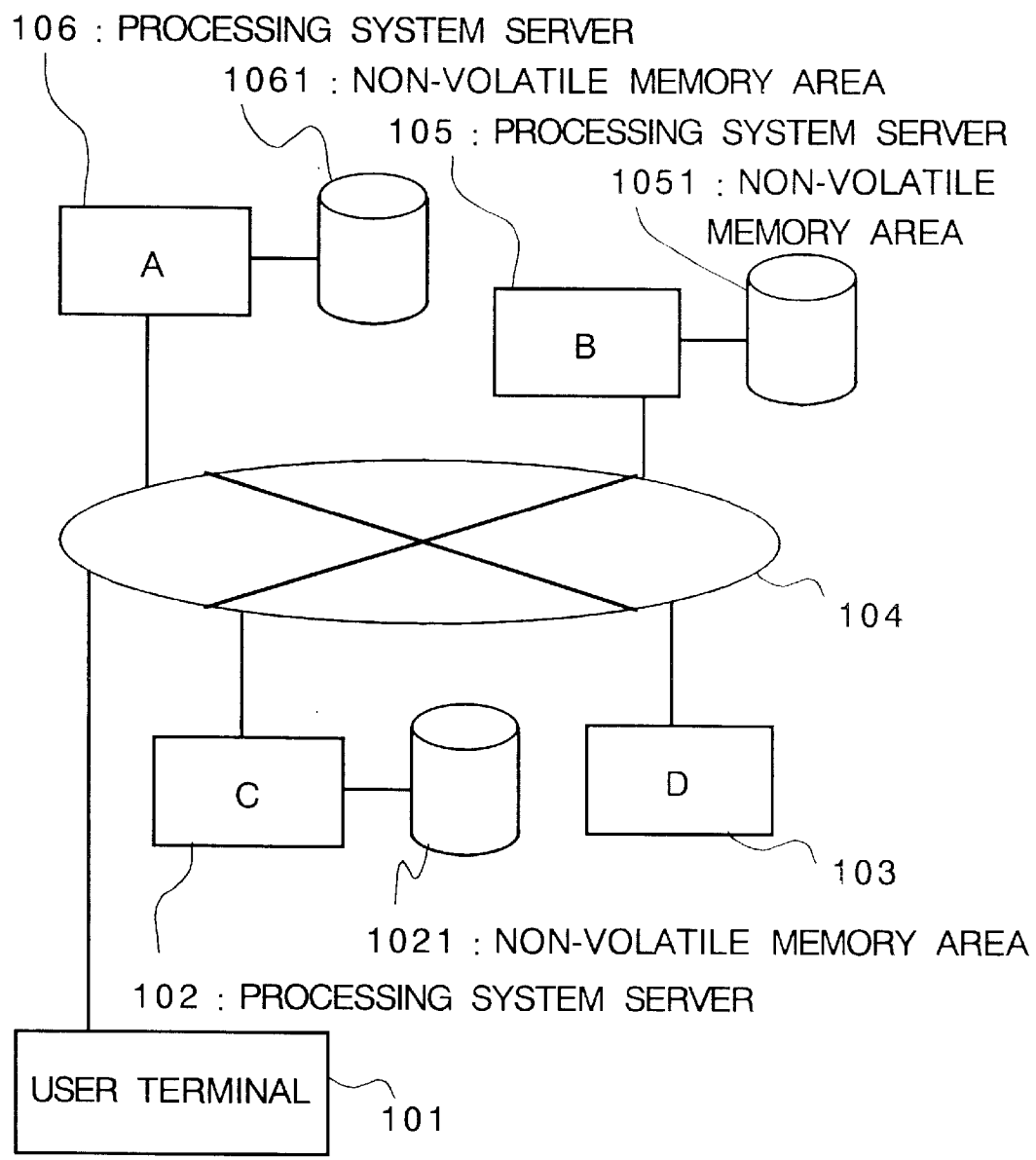
FIG. 1 is a schematic view illustrating one embodiment of the system configuration of the invention.

Reference will now be made in detail to the present preferred embodiments of the invention, examples of which are illustrated in the accompanying drawings, wherein like reference numerals indicate like elements throughout the several views.

An ideal application of the invention is explained in the following embodiment. This embodiment explains an agent used in performing transaction processing to update a database. The invention may also be applied to the agent that does not involve transaction processing.

In the invention, the agent is executed at a processing system, and the invention assumes the processing system to be an operating system or a system executing as the operating system. The processing system supplies a function to the agent which the system should provide, and as one of the functions, the processing system prepares a non-volatile memory area.

In this embodiment of the agent system, a specific method for moving an agent requires an environment that supports the moving of the agent capsulized as an object from computer to computer and from processing system to processing system.

The specific method for moving the agent can be of any kind in performing the invention. In other words, this invention does not depend on a specific procedure for agent transmission. It does not question the types of communication protocol used to move the agent.

When only one processing system resides at a computer, agent movement from one processing system to another processing system is the same operation as agent movement from one computer to an another computer. Depending on the specific communication protocol format, the values set at given fields can be different for agent movements between processing systems and computers as destinations. The different values should have no effect on the scope of the invention.

FIG. 1 is a diagram showing the configuration of agent system operation in accordance with the embodiment.

An agent is executed at a processing system on a server. Network 104 interconnects servers having processing systems. As an example, it is the network where (IP) used in internet passes through. The agent is created and sent from user terminal 101. Processing system servers 102, 103, 105 and 106 are server systems where each processing system operates. The agent moves within the network 104 using TCP/IP (Transmission Control Protocol/Internet Protocol). This embodiment adopts, for example, UDP (User Datagram Protocol) which is one of the TCP/IP. Non-volatile memory areas 1021, 1051 and 1061 are attached to the processing system servers, which are to be used by the agent being executed at the processing systems. The non-volatile memory areas 1021, 1051 and 1061 can store the agent sent to each server and can also memorize the status of agent execution. For the user terminal 101, an example program that sends the agent is JAVA applet, which is programmed in JAVA language and can be down-loaded from WWW (World Wide Web) site.

Figure 2:
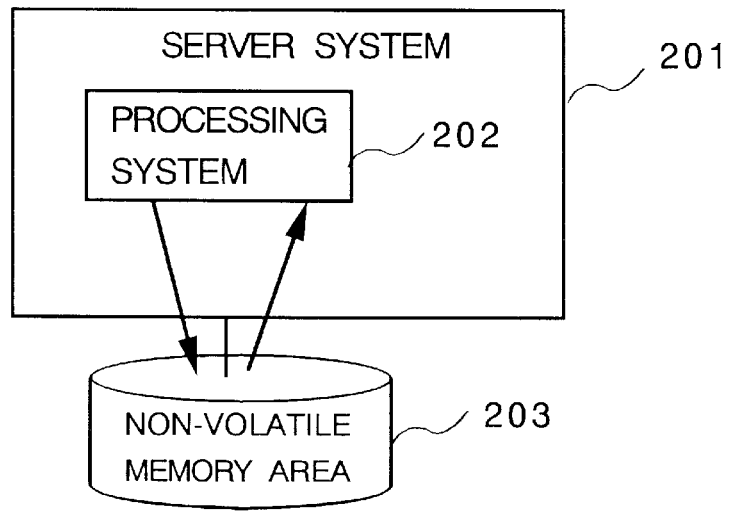
FIG. 2 is a schematic view showing an example system configuration of non-volatile memory in accordance with an embodiment of the invention.

Before explaining the system operation, an explanation follows on an example configuration of non-volatile memory used in the processing system of the invention, as set forth in FIG. 2.

Processing system 202 operates in a server system 201. The processing system 202 uses a non-volatile memory (disk) 203 to supply non-volatile memory area for the agent. The mechanism for supplying the non-volatile memory area in the embodiment is an extremely simple area control. When the processing system stores the arrived agent into the disk 203, or when the user demands for writing data from the agent to the disk 203, then the data (or agent) is simply added to a back of the disk area, and to a writing data pointer is updated. When there is only a certain amount of open area available at the back of the disk 203, the pointer is returned to the beginning of an unused area to release the unused area.

Normally, processing system 202 uses a disk write function installed in the server system 201 when writing data. However, for writing to the non-volatile memory 203 of this invention, a RAW disk interface is used to make an access. The RAW disk interface, for example, is an interface that directly reads and writes the data to disk 203 at the driver level, without influencing the upper level file system. When upper level file system is intervened, even when a manual processes for writing the file is completed, there are cases when writing to the disk 203 is not fully completed. When a server system crashed during the writing process, there occurs an inconsistency between a written data on file and a written data on disk such that there is no assurance for saving the context of the written data. For this reason, in this embodiment the disk used by the agent is accessed through the RAW disk interface.

A write operation from the agent to the non-volatile memory must be processed synchronously. When a reporting is made from the processing system for a normal completion of write operation, the agent or data will definitely be recorded inside the non-volatile memory area. If there was no reporting of normal completion, that is, if some kind of trouble occurred in the system during the write operation, only the context of data before the write operation is saved.

Figure 3:
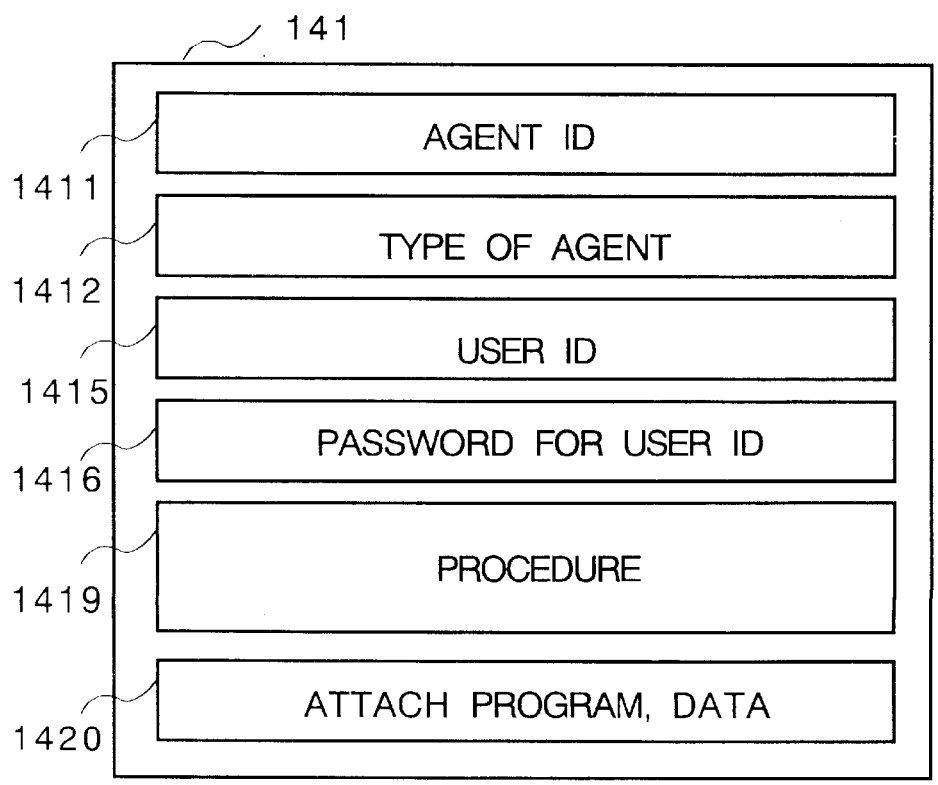
FIG. 3 is a schematic view showing an example configuration of the agent in accordance with the invention.

FIG. 3 is an example showing agent configuration used in a network agent system.

An agent 141 includes the followings: agent ID 1411 which identifies the agent; agent type 1412; user ID 1415 which identifies the user terminal; password 1416 for the user ID 1415; procedure (also called processing order) 1419 which processes the agent 141 at the server system 201; and program and data 1420 which are attached to the agent 141 as a result of processing at the server system 201. The procedures 1419 are written in an intermediate language format that can be read by any of the procedure decoding means and these are provided at each server system 201.

When the agent 141 is a retrieving agent used to retrieve a database, a procedure 1419 for retrieving the database, a name of the database and a condition for searching the database are written in the procedure 1419. When the agent 141 is an e-mail receiving agent, information on the types of mail that can be displayed at a receiving terminal and a name of a mail server are written in the procedure 1419. The invented agent has an area to store information used to control the agent 141 in the procedure 1419.

In the invention, a processing system collects a processing result of the agent execution as a log data. The log data also is treated as an object (log object). The collected log data can be stored on the disk 203, when disk space is available. If disk space is unavailable, then the log data is sent to an agent manager. The agent manager is a user that creates and issues an agent. Transmission of the log data to the agent manager is done by sending the log data to the user terminal that created and issued the agent. An example of transmission means to the user terminal is a port number of the user terminal used as an address for the transmission. As an another example, the log data can be transmitted using user ID that issued the agent as an address. The appropriate way of transmitting the log data depends on the actual means used to implement transmissions.

In the invention, the agent received at the processing system is stored at a non-volatile memory area provided at the processing system which is available for a use by the agent. This agent is stored before agent execution using previously installed logic in the processing system. Alternatively, when the agent arrives at the processing system during the course of agent procedure, the agent can register itself. The agent can be stored while the agent procedure is being executed at the processing system in accordance with the procedure.

The user creates an agent at the user terminal 101 in response to the service that need be executed. For example, the user is going to use an agent to update two database transactions. In such a case, one of four servers A, B, C, and D in FIG. 1 is selected by the user as a candidate server that requests the agent execution, and the procedure is programed to execute at the selected server. The user terminal acting as sender is identified using a port address of the user terminal.

In this embodiment, the processing systems can collect an operation log that stores the execution status of the executed agent. Whether the processing systems will collect the operation log depends on the function or processing abilities provided at the processing systems in the servers A, B, C and D. Likewise, the agent is provided with information (log collection flag) that indicates whether to collect the operation log, so the processing systems can determine the log collection based on the value of log collection flag.

The port address of a sender (user, agent manager) must be registered at the agent procedure when sending the agent, otherwise there will be no reporting of an operation log from the agent. What is meant by the reporting of the operation log from the agent is, to retrieve the operation log which holds the execution status of the executed agent in the processing system or to retrieve other state information to the user terminal. If the port address of sender was previously registered in the agent manager, the user which created the agent, or in other words, the agent manager can receive the operation log for retrieving. The agent transmission operation by the agent manager receiving the operation log will be described later.

In this embodiment, the port address for reporting to the agent manager is not registered in the agent. Therefore, the agent does not report its operation to the agent manager, and the operation log is written to the nonvolatile memory area of the processing system where the agent is executed.

Different processing systems have different properties. The agent will know the difference in properties by querying the processing systems. The agent can select a processing system from the accumulated data on the properties of the processing system in the agent, in accordance with the agent processing.

Figure 4:
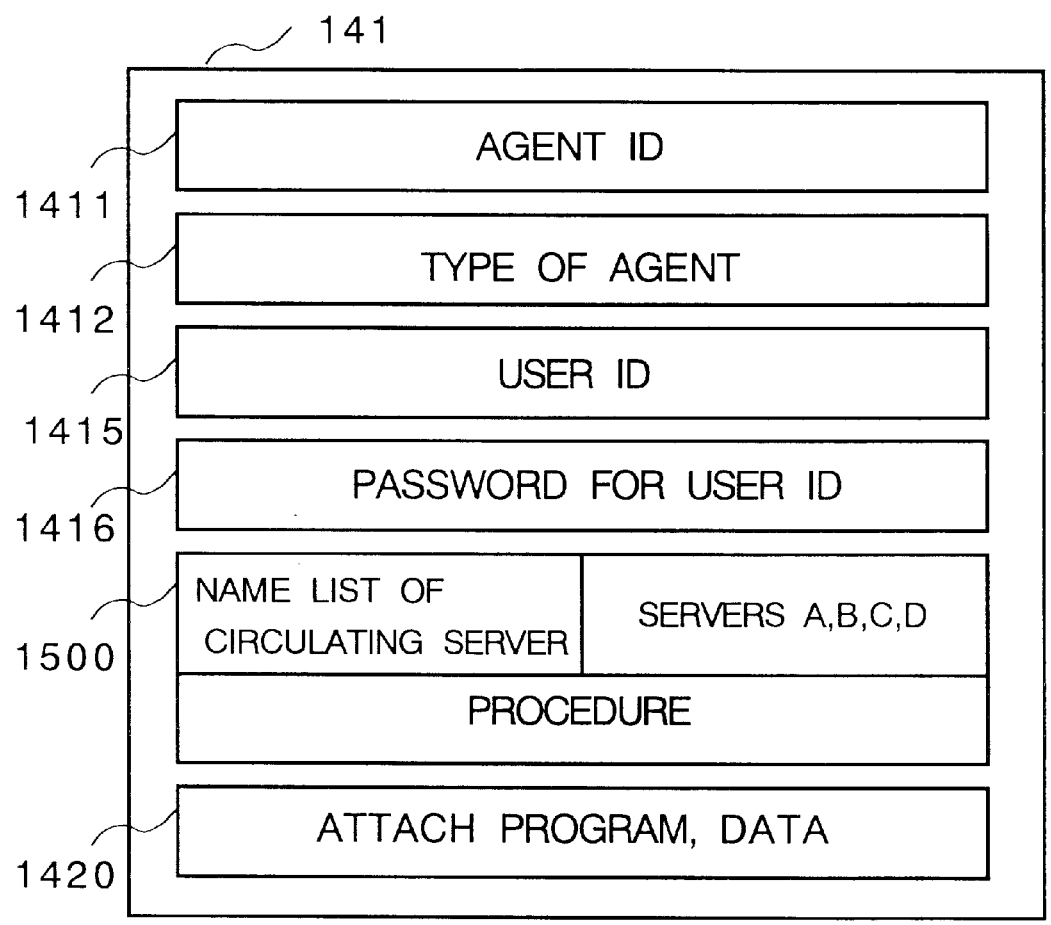
FIG. 4 is a schematic view showing another example configuration of the agent in accordance with the invention.

FIG. 4 shows a diagram of an agent 141 that writes a name list of circulating server (also called itinerary, name list of circulating server, or the list) in the procedure for execution.

The agent 141 moves in an order of the circulating server name list. It starts at server A, which is listed at the top of the circulating server name list. More precisely, the agent transmission mechanism observes the list (not shown in the figure) and transmits the agent to the address registered at the top of the address list using a communication function in the processing system located at server A. When the agent arrives at server A and when the processing starting method "start" is executed to commence the agent processing at the processing system, the agent detects the properties of server A by referring to the property information. The agent stores the property of referred server A inside the agent to examine the appropriateness of agent execution.

Figure 5:
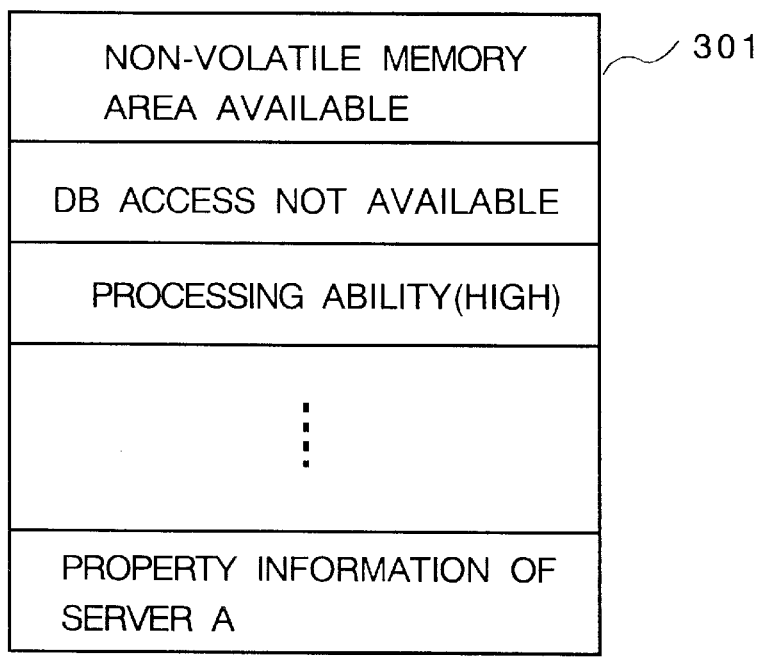
FIG. 5 is a schematic view showing an example of the processing system property of the invention.
Figure 6:
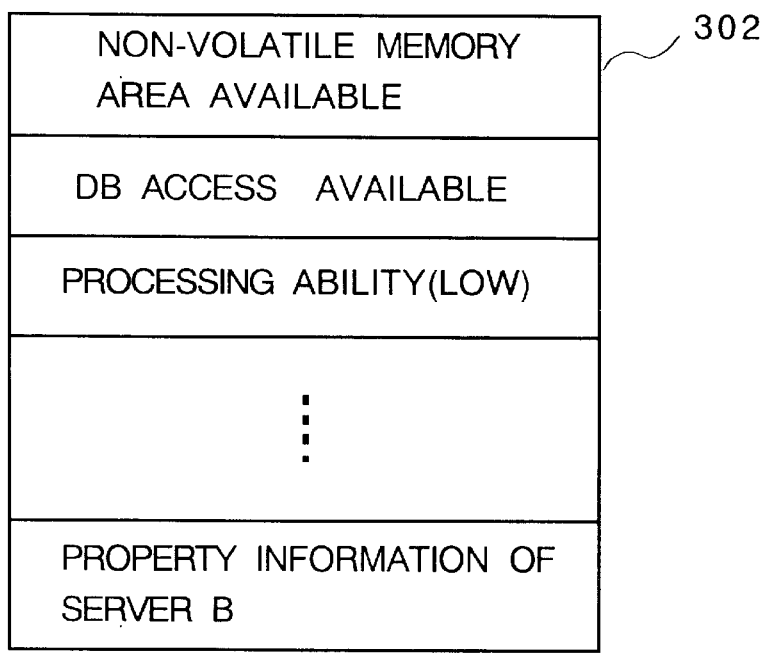
FIG. 6 is a schematic view showing another example of the processing system property of the invention.
Figure 7:
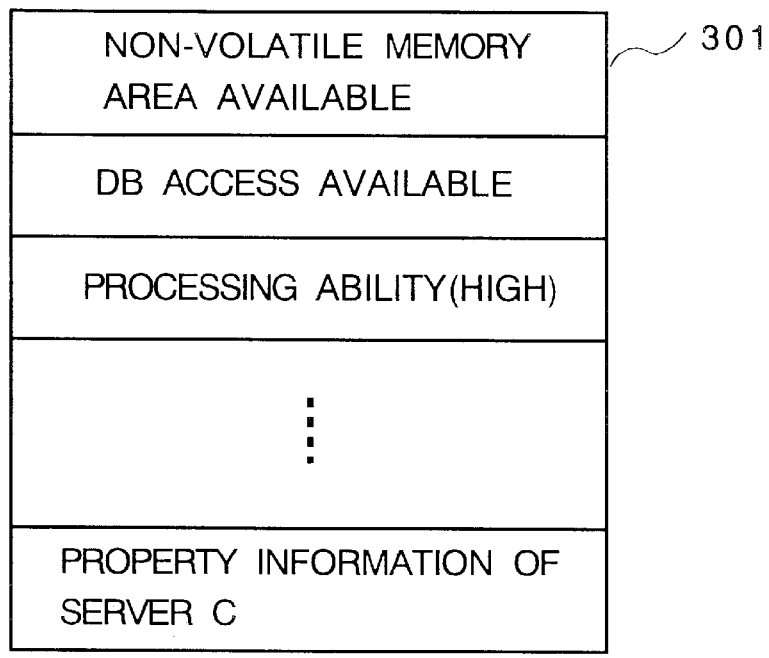
FIG. 7 is a schematic view showing yet another example of the processing system property of the invention.
Figure 8:
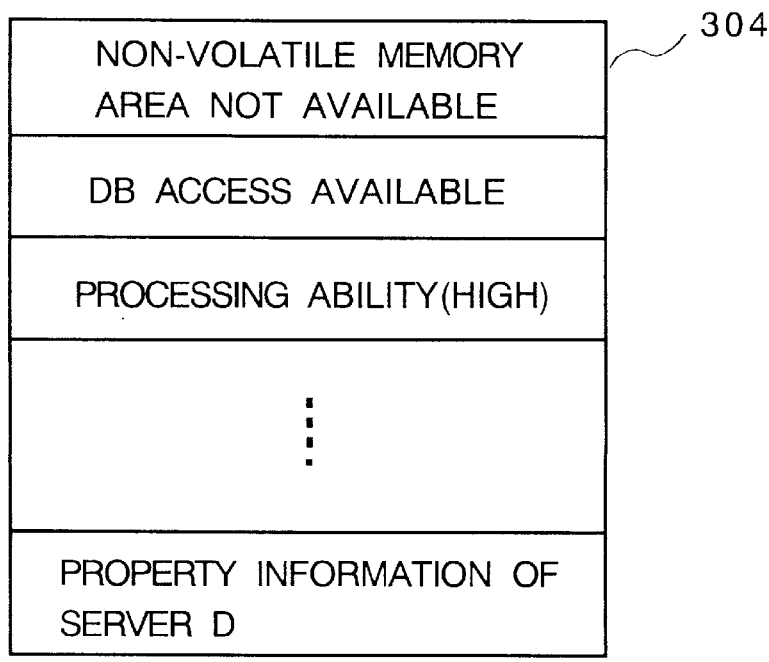
FIG. 8 is a schematic view showing still another example of the processing system property of the invention.

FIG. 5 illustrates an example of property information 301 showing property information of server A. FIG. 6 illustrates an example of the property information of server B. FIG. 7 illustrates an example of the property information of server C. FIG. 8 illustrates an example of the property information of server D.

As the property information, there are information of the processing system and property information of the computer (server).

If the agent 141 must execute database update processing, and at server A responds that "DB access not possible", the agent determines that it cannot be executed. The agent searches for an another server where the execution is possible, so it moves to server B which is a next entry on the circulating server name list.

Similarly to the case in server A, the agent examines the property information of server B for the appropriateness of execution. This time as shown in FIG. 6, at 302, server B includes the property information "DB access possible", thus processing is possible. The top of the property information of server B indicates that there is "non-volatile memory available", so the agent registers itself at the non-volatile memory area of server B. Accordingly, the registration to the non-volatile memory area is performed by referring to the property information in the server, and is performed when the server indicates "non-volatile memory available".

By attaching a non-volatile memory storage flag to a control information that manages the agent, the flag is set so that the property information is stored only during "non-volatile memory available" and when the non-volatile memory storage flag shows "1" i.e. "registered". Otherwise, the non-volatile memory storage flag can further be divided to store either the agent or the operation log, which is individually specified depending on the context of the application.

Upon registration, a processing system registers the control information shown in FIG. 9 at the top part of the storage area shown in FIG. 10. The control information includes magic number 410 is an identification number of a product, agent mechanism version 412, non-volatile memory storage flag 401, and log object ID 402 which is an ID of operation log. Re-try method offset 403 becomes re-try method address when re-executing the agent. Data pool number 414 provides a number of data to be stored relating to the agent.

The configuration of control information shown in FIG. 10 includes the followings: object ID 501 which is the agent ID of the agent system; object type 502; and state 503 which shows state information on the storage condition or validity of the object. FIG. 10 shows a valid case. Disk offset address 504 shows the disk address where the object is stored. The agent will be registered here so that the object can be registered as the execution object. Other object types (502)

include log (log object) and data. 510 is the area for registering the operation log.

After completing the registration of the agent itself, a processing system called "kailua@abc.opqrs.co.jp" of server B is registered as operation log. Then, the agent commences processing. As shown in FIG. 11, operations are executed from 602 to 607, and before each operation the logs are collected. Here, the database transactions are executed twice. Both operations, for example, are configured from "update", "delete" and "insert" operations, commit commencement, and commit completion. When the operation is completed, the agent returns to the sender user terminal.

Following is the explanation of a case where a problem has occurred in server B. The user conducted the same operation. But this time, as shown in FIG. 12, after agent arrival to the server is registered at 701, the server update operation is performed at 702, a commit processing is performed at 703, and the above are registered as operation log, a problem occurs at server B that requires a re-boot of server B.

Figure 13:
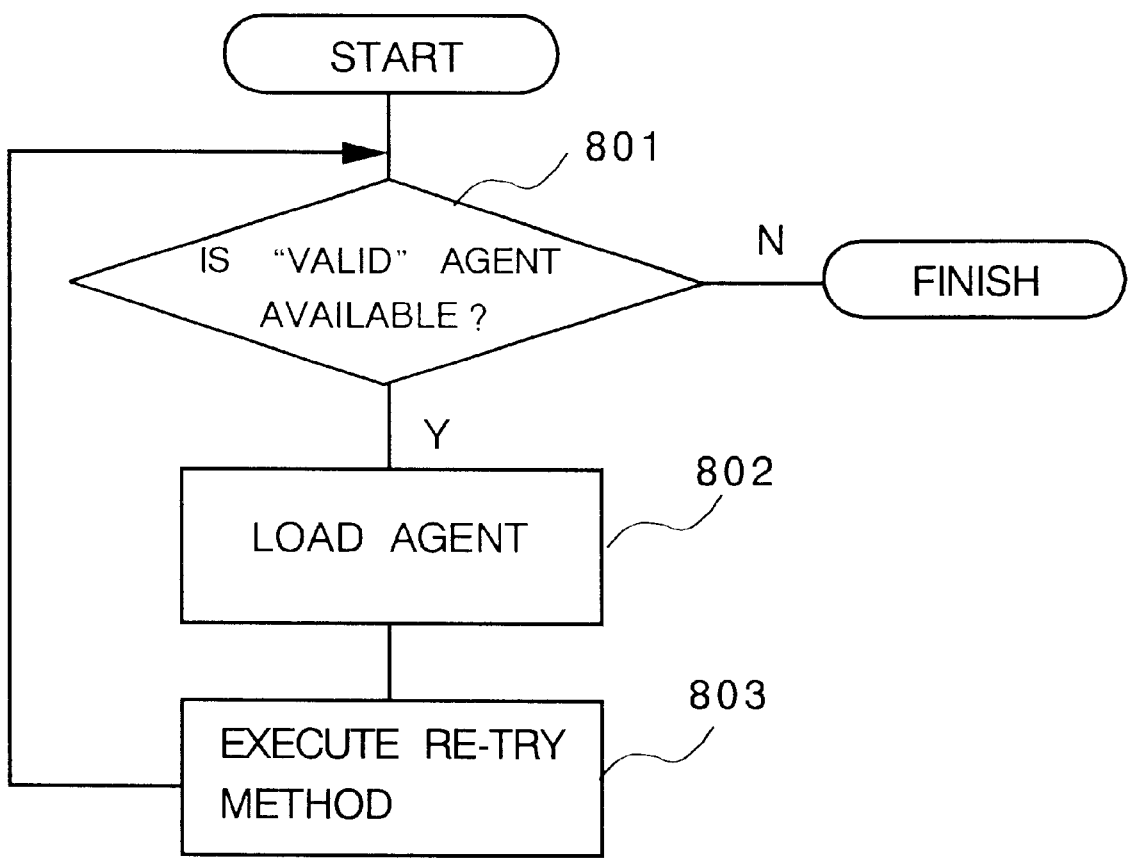
FIG. 13 illustrates an example flow chart of agent re-execution logic for the processing system of the invention.

When the system administrator (system manager) of server B re-boots the server B, its processing system is also restarted. The processing system performs the re-execution of the agent registered at the non-volatile memory area according to the logic of FIG. 13. At 801, all objects in valid states are searched. If the valid object is found, then re-load the object registered at processing system (802), and check control information of the agent as shown in FIG. 9. At this point, the processing system deletes an offset address and executes a re-try method "re-start" by accessing the address from retry method offset 403 to re-try method "restart" (803) inside the object.

When the agent starts re-execution, at 402, the log object ID becomes a pointer to the log object, and from the pointer the agent is able to obtain a log of operation before the system damage (FIG. 12). From this process, the agent learns that completion of commit operation for database update number one is uncertain, and begins a re-try operation from the updated commit number one. When the re-try operation completes normally, a result that is the same as the log execution result is obtained eventually as shown in FIG. 11, and the agent returns to the user terminal.

When both the operation log and the agent object are stored in the non-volatile memory area, agent re-execution is possible by referring to the operation log and loading the agent object.

Additionally, for a case of storing operation log only in the non-volatile memory area, the user requests the re-issue of the agent using the operation log as a source, and agent re-execution becomes possible. Due to the requested re-issuing, the user learns that the agent did not complete normally and will re-issue the agent.

Following is the explanation of a case for not storing the operation log of the agent.

The user creates a port to receive the operation log. The port is specified by UDP header, which is a number to distinguish the source of origin and destination address inside the host that carries the IP address. By setting the created port address on the agent, the user is able to receive the operation log of that agent. Now, the port address is set and the non-volatile memory area flag is set to "0". In addition, storing the agent to non-volatile memory is not required, and in a similar manner to the case described previously the agent is transmitted. The agent follows the same path as the previously described case and commences the execution again at the processing system of server B. Using the timing of storing the operation log as described in the previous example, the same message context (operation log) as the described example is send to the agent manager in the user terminal.

Here, the trouble occurred in the system when a series of messages as shown in FIG. 12 are sent to the agent manager. If a commit message of updated database number one is not returned within a previously set time, then the user determines that processing did not proceed normally and deletes the agent by sending a deletion message. The user will know a current port address of the agent when the user receives a message from the agent. Therefore, sending an agent deletion message to the current port address deletes the agent at the processing system where the agent was being processed.

Continuing from the received operation log, the user recreates a list of execution processes and creates an agent with a list of execution processes. The created agent continues the processing of the previous agent and moves according to the same circulation list as the previous agent. The port address for receiving the operation log is still server B. However, server B has not yet been recovered from trouble so the next destination is server C, which is registered next to server B on the list. When the agent arrives at server C it checks for the status of server C as shown in FIG. 7. If server C indicates "DB access possible", then the agent execution begins in the processing system at the server C and is returned after the continuation processing. Consequently, agent re-execution is possible by sending back the operation log to the user terminal.

In this case, the agent re-execution is performed at server C, not server B, because re-execution of the processing system at server B would result in double processing. However, when booting the server B again, the previously sent agent state is already deleted. This deletion can prevent the occurrence of double processing.

As discussed above, there should be no problem with the operation log because it is already sent to the user terminal, and it is not stored in the non-volatile memory.

The embodiment described above explains a case of storing both the log and agent, and a case of storing the log only but not the agent, however, a case can be made to store the agent only. There will be a similar effect whether the stored data is an agent or an operation log, as long as the deletion message is issued to the stored data. Following is the explanation of a case for leaving the operation log.

Here, the user uses an agent to cancel the execution operation because the port address for receiving state information is not registered in the previous agent. That is, when the operation log is not sent to the user terminal but is left behind in the processing system, the cancellation is performed in the manner that follows.

Cancellation is done by issuing a cancelling agent that has a same name list of circulating servers as the previous agent to be cancelled. When the cancelling agent enters a processing system it searches the non-volatile memory for an object ID of the previous agent to save the information previously saved and related to the previous agent onto the cancelling agent. The reason for saving is to use the saved information in the process which will be described later. When "valid" is set at searched information state 503, the previous agent to be cancelled is in the middle of execution. A fixed signal prepared previously by the processing system stops the previous agent execution and the previous agent is deleted. After deleting the previous agent, the fields of state 503 of the registered agent and its operation log in the non-volatile memory area are set to "invalid". Then an operation correction processing (i.e., rollback of database) is performed based on the previously registered operation log of the agent.

If the state 503 stored at the non-volatile memory area is "save", the agent had already finished processing in the processing system and is moving on to the next destination. In such a case, the previous agent itself is saved, its operation log is deleted, and then the rollback processing of database is performed.

As explained previously, after the chasing of the agent using operation log and server circulating list, and the cancelling process is finished, the cancelling agent returns to the user.

When the port address which receives the state information is registered at the agent to be cancelled, or in other words, the agent sends operation log to user terminal so the operation log is not left behind in the processing system, the user refers its state information (operation log), sends a deletion message to the processing system and re-issues the rollback processing agent to perform agent cancellation.

Following is the explanation of an example procedure for selecting a processing system to execute the agent. It is assumed that the agent already has the procedure to execute itself.

When the agent arrives at the processing system, the agent refers to the property information of the processing system to compare the property information with the execution condition of itself. As a result of the comparison, if the execution condition of the agent and the property information of processing system matches, then the execution in that processing system is commenced. If they don't match, the agent moves to a next processing system. The agent similarly checks the property information of the arrived processing system, and continues to move until it reaches the matching processing system.

As previously described, the agent can move in accordance with the circulating list where the agent manager beforehand writes the circulating list in the agent procedure. The order of moving is the order written in the circulating list, or, it can be a random order. In other words, the order can be specified in detail in the procedure, or, it can be prepared to have an option in the procedure that allows the processing system and moving agent to choose the order.

If the agent execution was not possible at the processing system, the agent manager can ask for a substitute processing system. If execution of the agent is completed at a particular processing system, the processing system can ask for a candidate processing system, and the candidate can be the next moving destination. Or, selection of processing system can be a combination of these two methods.

Following is a case for selecting an ideal processing system by collecting properties from a plurality of processing systems.

Here, a number of processing systems where the agent collects property information is assumed to be 5. This is one example, and it is merely an optional number which can also be, for example, 10 or 20. The agent moves within the network to obtain property information at the arrived processing system. The agent repeats the collection of property information until it reaches the number of processing systems specified. When the specified processing number has been reached (5 in this example) the agent selects for its matching execution condition from the collected property information of the processing systems. If there was a plurality of processing systems that matches one of the conditions, then the agent selects further for its match using a second condition. If a plurality of matches are found after the process is repeated, the agent can set up a priority order by selecting the processing system in the order of high to low criticality of performances.

The selection of processing systems can also be based on the efficiencies of moving through the processing systems, not just on high or low priority of performances of the processing. In such a case, the efficiencies of moving is determined from property information. The processing system can also be selected from the mentioning order in the list. Further, the priority order can be set as a default beforehand, and the order of priority is used when the execution condition cannot be used.

Figure 14:
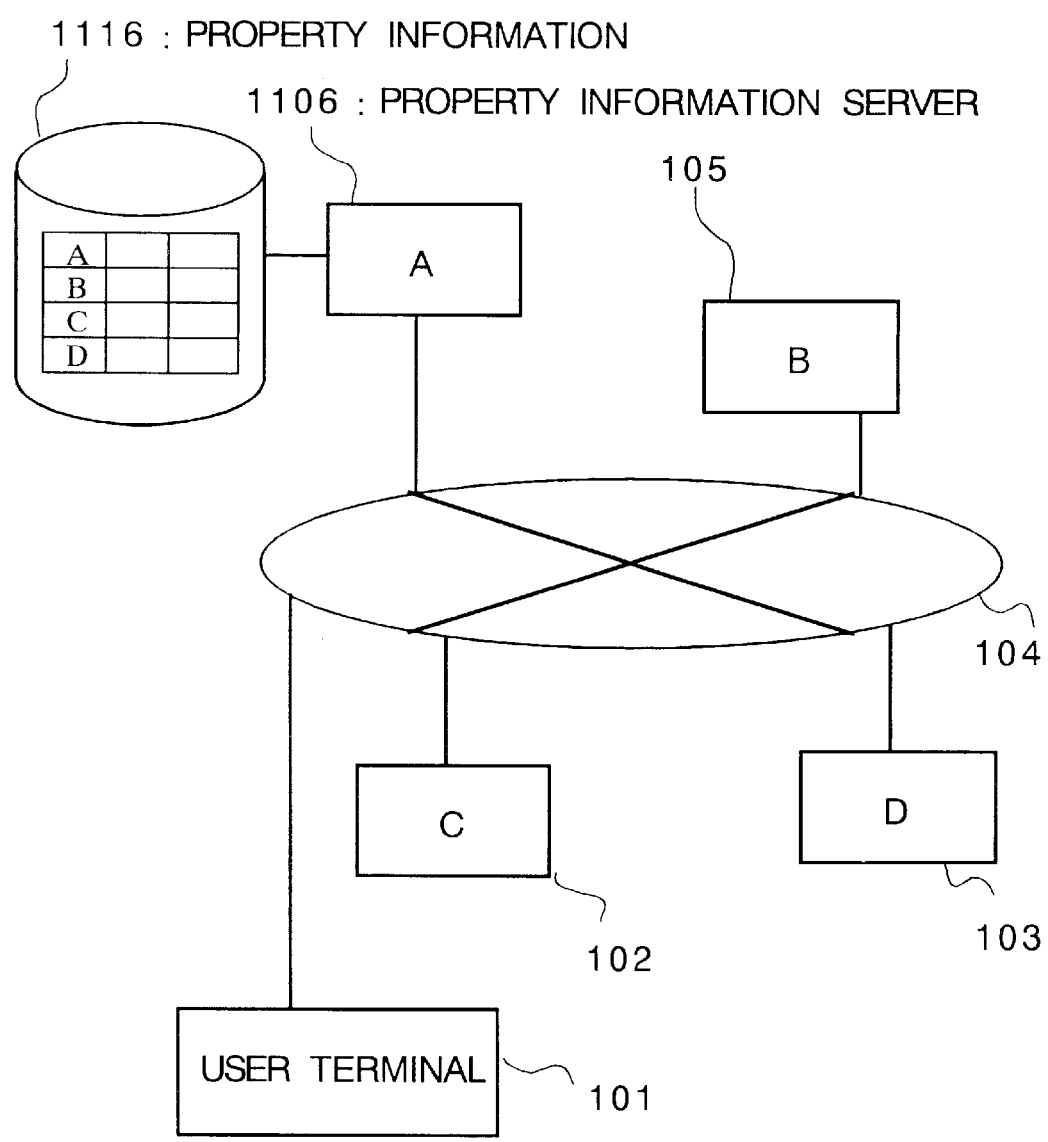
FIG. 14 is a schematic view showing a property information server in accordance with an embodiment of the invention.
Figure 16:
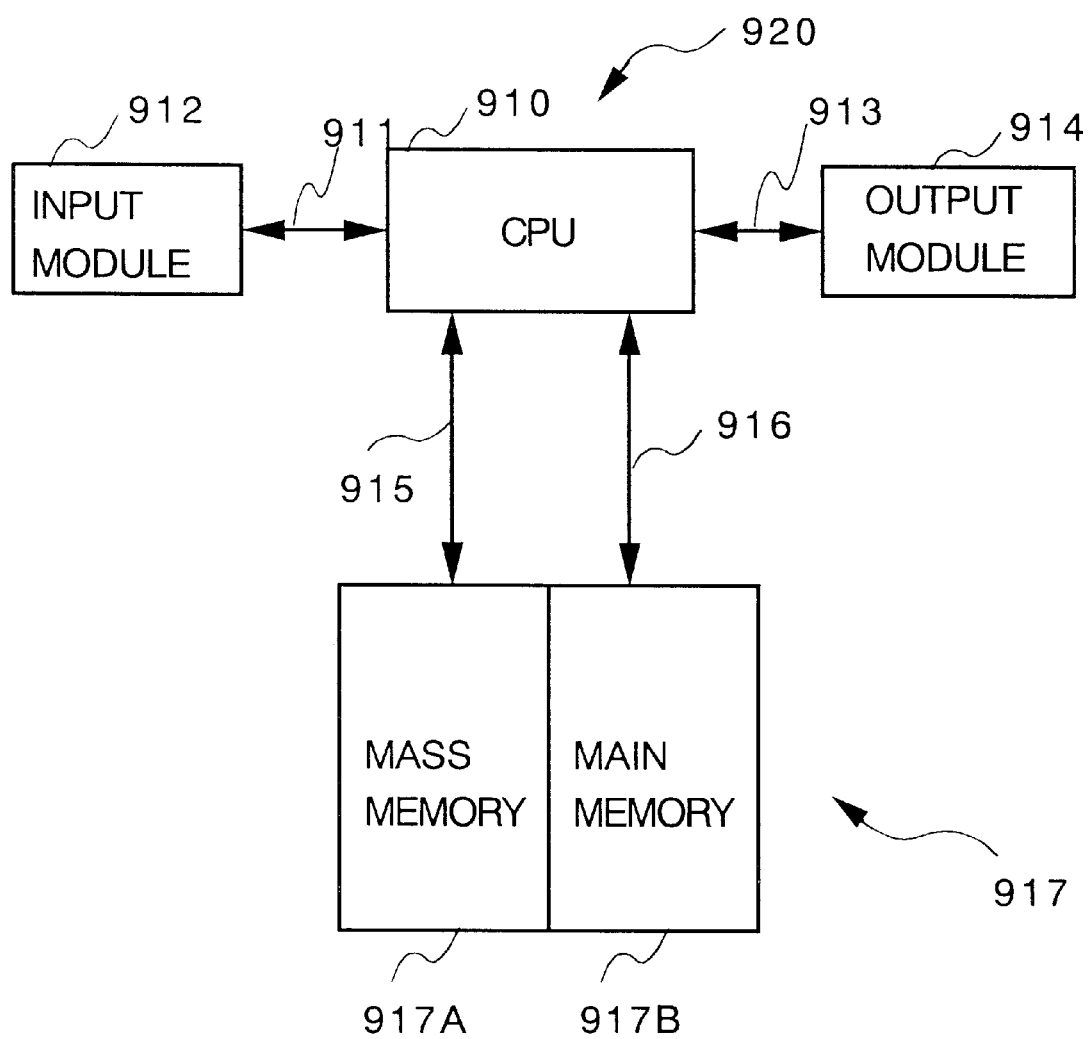
FIG. 16 is a computer system configuration of the related art.
Figure 17:
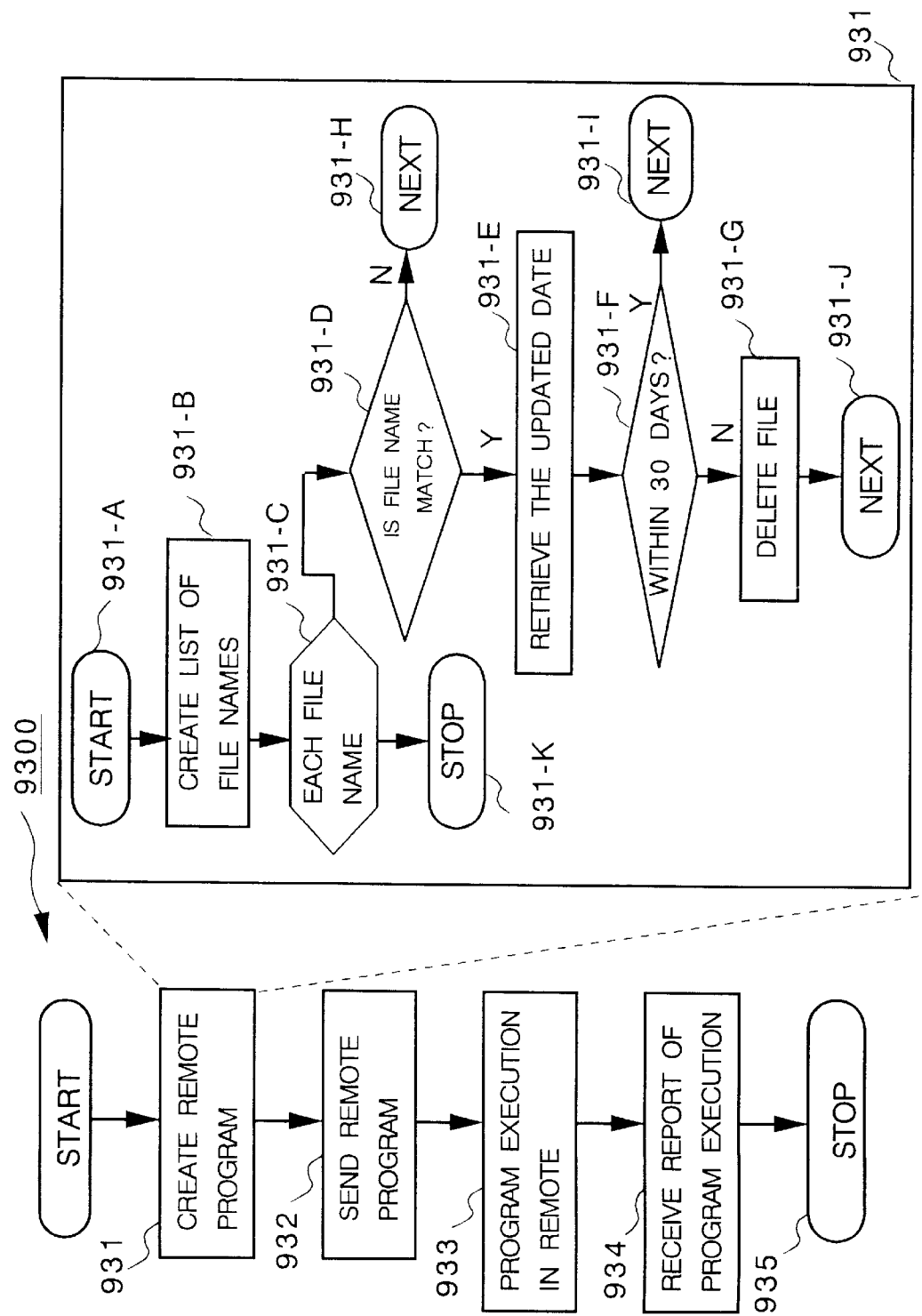
FIG. 17 is a flow chart of remote programming for the related art.
Figure 18:
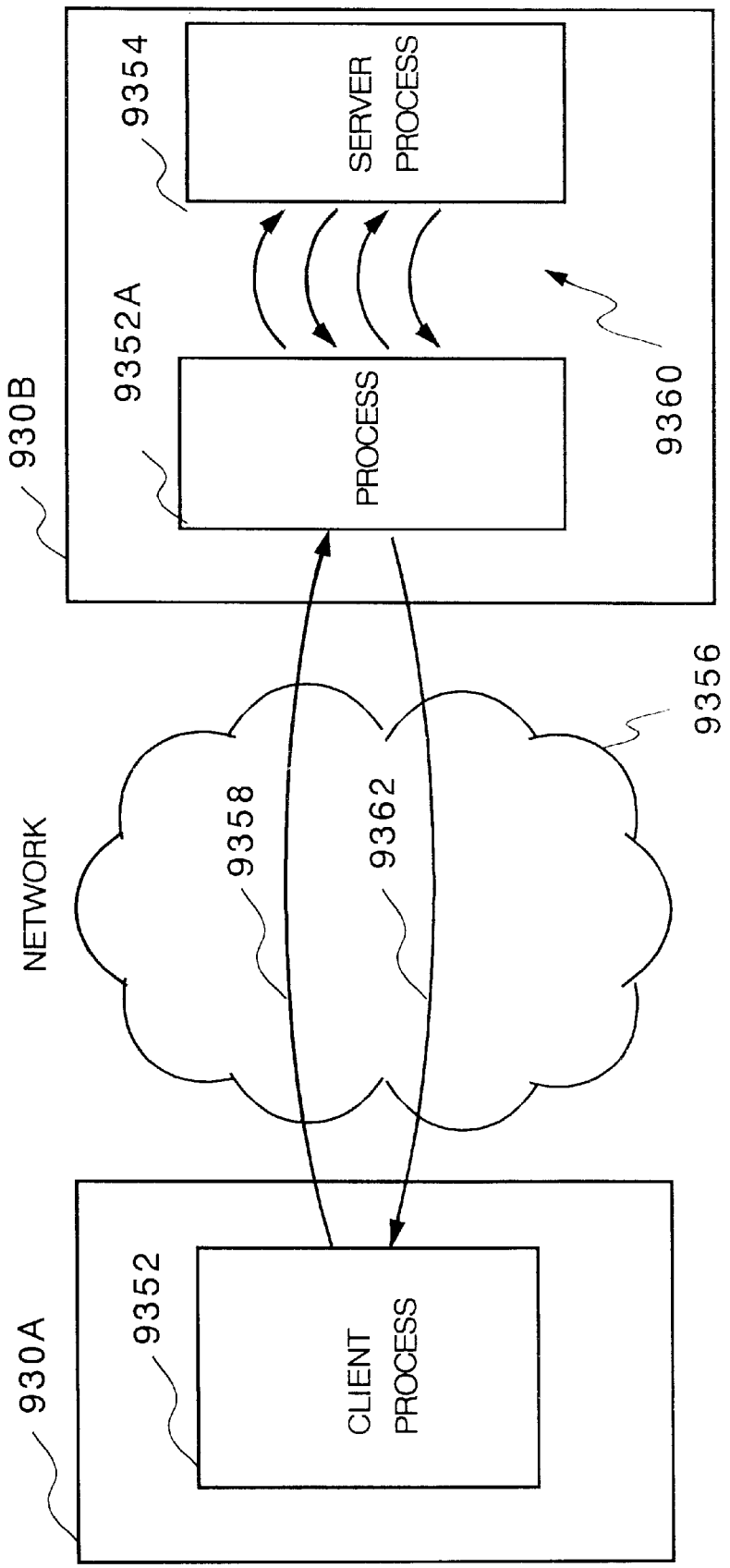
FIG. 18 is a remote programming network for the related art.

An explanation on the property information server follows using FIGS. 14 and 15.

FIG. 14 is a diagram showing property information servers that supply a plurality of property information to the agent from the processing systems where agent processing is possible.

In the diagram, a property information server 1106 memorizes a property information 1116 to the non-volatile memory, and the agent refers to the property information 1116. An example of property information 1116 is shown in FIG. 15. The context of the property information 1116 is identical to previously described property information of servers A to D shown in FIGS. 5–8. However, this property information is collected on one server to form one property information server, and depending on a requirement of the property information server (in this example, server A), other property information servers are also supplied as one property information server. This is the characteristic of property information servers.

By receiving the service from a property information server, the agent can select a server that is ideal for the execution in a shorter time without causing extensive load on the network.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An agent system comprising:
   a user terminal that creates and transmits a first agent having data and a procedure to process the data;
   a server including a processing system that receives the first agent transmitted from the user terminal,
   said server processing the data according to the procedure to execute the first agent without requiring a connection between the user terminal and the server;
   the server also including a non-volatile memory that can be accessed by the first agent; and
   an operation log storing an execution status of the first agent, wherein the execution status is control information related to an execution of the first agent's procedure and is used by at least one of said server and said user terminal to initiate re-execution of the first agent when execution of the first agent by said server is interrupted;
   the processing system storing at least one of the first agent and the operation log in the non-volatile memory.

2. The agent system of claim 1, wherein the processing system transmits the operation log to the user terminal.

3. The agent system of claim 2, wherein the user terminal, re-issues the first agent corresponding to the operation log, in accordance with a returned operation log, to execute the first agent.

4. The agent system of claim 1, wherein the both of the first agent and the operation log are stored in non-volatile memory, the processing system re-executes the first agent in accordance with the operation log, using the first agent.

5. The agent system of claim 1, wherein when the operation log is stored in the non-volatile memory and the first agent is not stored in the non-volatile memory, the processing system requests re-issue of the first agent at the user terminal in accordance with the operation log, and performs re-execution of the first agent.

6. The agent system of claim 1, wherein the user terminal deletes the agent, in accordance with the operation log.

7. The agent system of claim 1, wherein the user terminal issues a chasing agent to chase the first agent, in accordance with the operation log.

8. The agent system of claim 7, wherein the chasing agent chases the first agent, and cancels the recorded operation log corresponding to the first agent.

9. The agent system of claim 1, further comprising:

a chasing agent issued to chase the first agent by referring to the operation log, the chasing agent canceling the operation log corresponding to the first agent.

10. A method for executing an agent system, comprising:

creating a first agent having data and a procedure to process the data;

transmitting the first agent to a processing system;

processing the data according to the procedure to execute the first agent without requiring a connection between the processing system and a user terminal;

accessing a non-volatile memory with the first agent;

collecting an operation log with the processing system, the operation log including an execution status of the first agent, wherein the execution status is control information related to an execution of the first agent's procedure and is used by at least one of said processing system and said user terminal to initiate re-execution of the first agent when execution of the first agent by said processing system is interrupted; and storing at least one of the first agent and the operation log in the non-volatile memory.

11. The method of claim 10, further comprising transmitting operation log to the user terminal with the processing system.

12. The method of claim 11, further comprising:

reissuing the first agent corresponding to the operation log in accordance with a returned operation log; and executing the first agent.

13. The method of claim 10, further comprising re-executing the first agent with the processing system in accordance with the operation log when both of the first agent and the operation log are stored in non-volatile memory.

14. The method of claim 10, further comprising:

requesting reissue of the first agent at the user terminal in accordance with the operation log; and performing execution of the first agent with the processing system when the operation log is stored in the non-volatile memory and the first agent is not stored in the non-volatile memory.

15. The method of claim 10, further comprising deleting the agent in accordance with the operation log.

16. The method of claim 10, further comprising;

issuing a chasing agent to chase the first agent by referring to the operation log corresponding to the first agent;

utilizing the chasing agent to cancel the operation log corresponding to the first agent.

17. The method of claim 16, further comprising utilizing the chasing agent to cancel he recorded operation log corresponding to the first agent.

18. An agent system, comprising:

a user terminal that transmits an agent having a function to a plurality of processing systems on a plurality of servers connected via a network; and a property information server that stores property information including information related to a property of the plurality of processing systems, wherein the agent selects a first one of the plurality of processing systems for optimum execution of the agent's function when compared with other ones of the plurality of processing systems by referring to the property information stored in the property information server, wherein the property information includes an ability of the corresponding server to access a memory, and wherein the function is accessing the memory.

19. An agent system, comprising:

a user terminal that transmits an agent having a function to a plurality of processing systems on a plurality of servers connected via a network; and a property information server that stores property information including information related to a property of the plurality of processing systems, wherein the agent selects a first one of the plurality of processing systems for optimum execution of the agent's function when compared with other ones of the plurality of processing systems by referring to the property information stored in the property information server, and wherein, when the first processing system is unable to perform a function requested by the agent, the agent accesses the property information server to select a second one of the plurality of servers for execution of the function.

* * * * *